United States Patent
Nakanishi

(10) Patent No.: US 7,347,447 B2
(45) Date of Patent: Mar. 25, 2008

(54) CURTAIN AIRBAG DEVICE

(75) Inventor: Ryosuke Nakanishi, Shiga (JP)

(73) Assignee: Takata Corporation (JP)

( * ) Notice: Subject to any disclaimer, the term of this patent is extended or adjusted under 35 U.S.C. 154(b) by 83 days.

(21) Appl. No.: 11/264,265

(22) Filed: Nov. 1, 2005

(65) Prior Publication Data
US 2006/0097493 A1    May 11, 2006

(30) Foreign Application Priority Data
Nov. 5, 2004    (JP)    ............... 2004-322519

(51) Int. Cl.
*B60R 21/16* (2006.01)
(52) U.S. Cl. ................ 280/730.2; 280/743.2
(58) Field of Classification Search ............. 280/730.2, 280/743.2
See application file for complete search history.

(56) References Cited

U.S. PATENT DOCUMENTS

| | | | |
|---|---|---|---|
| 6,237,938 B1 | 5/2001 | Boxey | |
| 6,241,277 B1* | 6/2001 | Heigl et al. | 280/730.2 |
| 6,273,458 B1* | 8/2001 | Steffens et al. | 280/730.2 |
| 6,371,512 B1* | 4/2002 | Asano et al. | 280/730.2 |
| 6,412,810 B1* | 7/2002 | Wipasuramonton et al. | 280/730.2 |
| 6,454,296 B1* | 9/2002 | Tesch et al. | 280/730.2 |
| 6,530,594 B1 | 3/2003 | Nakajima et al. | |
| 6,733,035 B2 | 5/2004 | Thomas et al. | |
| 6,783,152 B2 | 8/2004 | Tanase et al. | |
| 6,866,293 B2 | 3/2005 | Ogata | |
| 6,896,288 B2* | 5/2005 | Tanaka et al. | 280/743.2 |
| 6,964,431 B2* | 11/2005 | Nakamura et al. | 280/743.2 |
| 7,004,498 B2* | 2/2006 | Daines et al. | 280/730.2 |
| 2003/0168835 A1* | 9/2003 | Thomas et al. | 280/730.2 |
| 2004/0056457 A1 | 3/2004 | Bossecker et al. | |

FOREIGN PATENT DOCUMENTS

| | | |
|---|---|---|
| EP | 1342629 A2 | 9/2003 |
| EP | 1342829 A3 | 4/2004 |
| JP | 2002347560 A | 12/2002 |
| JP | 2003054351 | 2/2003 |
| JP | 2003081048 A | 3/2003 |
| JP | 200406745 | 3/2004 |

\* cited by examiner

*Primary Examiner*—Ruth Ilan
*Assistant Examiner*—Leonard McCreary, Jr.
(74) *Attorney, Agent, or Firm*—Fitch, Even, Tabin & Flannery

(57) ABSTRACT

A curtain airbag device is provided that allows for smooth downward deployment of a curtain airbag. In one form, a C-pillar has a guide rod attached thereto for guiding a rear portion of a curtain airbag when the curtain airbag is being inflated downward. The rear portion of the curtain airbag has a link strap attached thereto. A front end of the link strap is provided with a loop which is loosely wound around the guide rod. For guiding downward movement of the link strap, a linear member extends between a lower portion of the curtain airbag and the link strap. The linear member extends through guide components. During a downward deployment process of the curtain airbag, the linear member pulls the loop of the link strap downward. Thus, the link strap moves downward smoothly along the guide rod for smooth deployment of the curtain airbag.

19 Claims, 3 Drawing Sheets

CURTAIN AIRBAG DEVICE

FIELD OF THE INVENTION

The present invention relates to curtain airbag devices equipped with guiding means for guiding curtain airbags deployed along inner side surfaces of vehicle cabins.

BACKGROUND OF THE INVENTION

In a vehicle provided with a curtain airbag device, when the vehicle is involved in, for example, a side-on collision or rollover, curtain airbags are deployed downward along inner side surfaces (for example, doors and pillars) of the vehicle cabin so as to protect the head of each vehicle occupant and to keep each vehicle occupant inside the vehicle cabin.

U.S. Pat. No. 6,237,938 discloses an example in which a guiding element is disposed along a C pillar. Specifically, such a guiding element is provided for guiding a rear portion of a curtain airbag, which is inflatable along an inner side surface of a vehicle cabin, in the downward direction along pillars.

The guiding element according to U.S. Pat. No. 6,237,938 includes a track member having a box-shaped cross-section, and a slider which is disposed within the track member and is movable in the longitudinal direction of the track member. A tether (cord) extending from the rear portion of the curtain airbag is tied to the slider. When the curtain airbag is to be deployed downward, the tether pulls the slider so that the slider is shifted downward along the track member. For preventing the rear portion of the curtain airbag from being retracted upward after being moved downward, the track member is provided with latches, which are disposed at a regular interval substantially along the entire length of the track member.

The top and bottom ends of the track member are provided with mounting flanges. Each of the flanges is fixed to the C pillar with a bolt or a screw.

On the other hand, according to Japanese Unexamined Patent Application Publication No. 11-91490, an overhang member projected towards the interior of a vehicle cabin is provided. Specifically, such an overhang member allows the curtain airbag to jump over an upper end of a pillar garnish during the deployment process of the curtain airbag so as to guide the curtain airbag towards the interior of the vehicle cabin.

Furthermore, Japanese Unexamined Patent Application Publication No. 2002-347560 and Japanese Unexamined Patent Application Publication No. 2003-81048 each disclose a curtain airbag device in which the rear portion of an inflated curtain airbag is pulled backward with a rope so that a strong tension is created along a lower line of the curtain airbag.

According to the curtain airbag device of U.S. Pat. No. 6,237,938, when the downward deployment process of the curtain airbag is started and the base end of the tether is pulled downward by the curtain airbag, the downward movement of the front end of the tether may be held back due to a frictional force generated between the slider and the track member. This may possibly inhibit a smooth deployment process of the curtain airbag.

On the other hand, in Japanese Unexamined Patent Application Publication No. 11-91490, the lower portion of the deploying curtain airbag cannot be drawn in towards the inner side surface of the vehicle cabin.

In Japanese Unexamined Patent Application Publication No. 2002-347560 and Japanese Unexamined Patent Application Publication No. 2003-81048, if an interior cover, such as an interior trim panel, is present inside the vehicle cabin, it is extremely difficult to set up a rope due to limitations of space.

SUMMARY OF THE INVENTION

Accordingly, an object of the present invention is to provide a curtain airbag device that allows for smooth downward deployment of a curtain airbag.

A curtain airbag device according to one aspect of the present invention includes a curtain airbag which is capable of being deployed downward along an inner side surface of a vehicle cabin; an inflator for inflating the curtain airbag; a guiding element for guiding the curtain airbag, the guiding element extending in a vertical direction and being attached to a pillar of a vehicle; a linking member for linking the curtain airbag and the guiding element; a linear member whose first end is connected to a lower portion of the curtain airbag and whose second end is connected to the linking member; an upper guide component for guiding the linear member, the upper guide component being disposed in an upper portion of the guiding element or in a vicinity of the upper portion of the guiding element; and a lower guide component for guiding the linear member, the lower guide component being disposed in a lower portion of the guiding element or in a vicinity of the lower portion of the guiding element. The linear member connected to the lower portion of the curtain airbag is linked with the linking member via the upper guide component and the lower guide component in that order.

Furthermore, according to the curtain airbag device in one form, in the previously described configuration, the guiding element may be a guide rod. The linking member may have its base end connected to the curtain airbag and its front end slidably connected to the guide rod. The second end of the linear member may be connected to a midsection of the linking member between the base end and the front end of the linking member, or to a section of the linking member closer to the front end of the linking member from the midsection.

Furthermore, according to the curtain airbag device in another form, in either of the previously described configurations, the lower guide component may be integrally provided in the lower portion of the guiding element.

Furthermore, according to the curtain airbag device in another form, in any of the previously described configurations, the curtain airbag may be disposed in a folded manner at an upper portion of the inner side surface of the vehicle cabin. Moreover, an overhang member projected towards an interior of the vehicle cabin may be provided below the folded curtain airbag disposed at the upper portion of the inner side surface of the vehicle cabin, such that the overhang member guides the curtain airbag towards the interior of the vehicle cabin during a downward deployment process of the curtain airbag. In this case, the upper guide component may be provided in the overhang member.

Furthermore, according to the curtain airbag device in yet another form, in any of the previously described configurations, the upper guide component may be integrally provided in the upper portion of the guiding element.

According to the curtain airbag device of the present invention, when the inflator is activated, the curtain airbag is deployed downward along the inner side surface of the vehicle cabin. In this case, the linking member is shifted along the guiding element. In the present invention, the linear member extending from the lower portion of the curtain airbag is linked with the linking member via the upper guide component and the lower guide component. Thus, the linking member is pulled downward via the linear member in response to a downward deployment force of the curtain airbag.

Accordingly, the linking member is smoothly shifted downward along the guiding element, whereby the curtain airbag is deployed smoothly along the inner side surface of the vehicle cabin.

Specifically, in one form, in a case where the linear member pulls the midsection of the linking member or the section of the linking member closer to the front end thereof (i.e. a section of the linking member closer to the guiding element), the linking member can be shifted downward in an extremely smooth manner along the guiding element. This allows for an extremely smooth deployment process of the curtain airbag.

Furthermore, in certain other forms, in a case where the lower guide component or the upper guide component is integrated with the guiding element, the guide component does not need to be installed in the vehicle body in a singular fashion. Thus, the installation process of the curtain airbag device in the vehicle body can be simplified.

According to the present invention, in another form, an overhang member for guiding the curtain airbag towards the interior of the vehicle cabin may be disposed below the folded curtain airbag. In this case, the upper guide component may be provided in this overhang member. This eliminates the need for installing the upper guide component in the vehicle body in a singular fashion.

DETAILED DESCRIPTION OF THE PREFERRED EMBODIMENTS

Figure 1A:
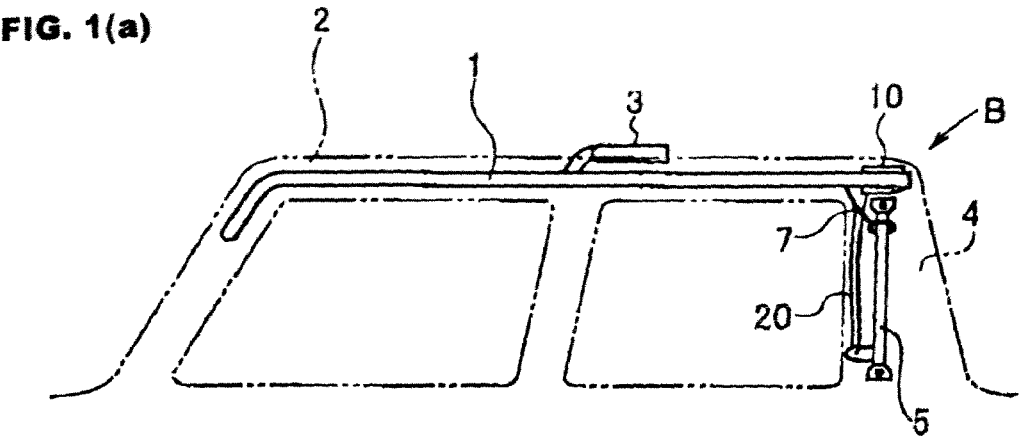
FIGS. 1(a) and 1(b) illustrate a curtain airbag device according to an embodiment of the present invention, and includes a schematic view FIG. 1(a) illustrating a curtain airbag extending along a roof side of a vehicle, and a guide rod disposed along a C pillar; and an enlarged perspective view FIG. 1(b) illustrating an area indicated by an arrow B in the schematic view FIG. 1(a).
Figure 1B:
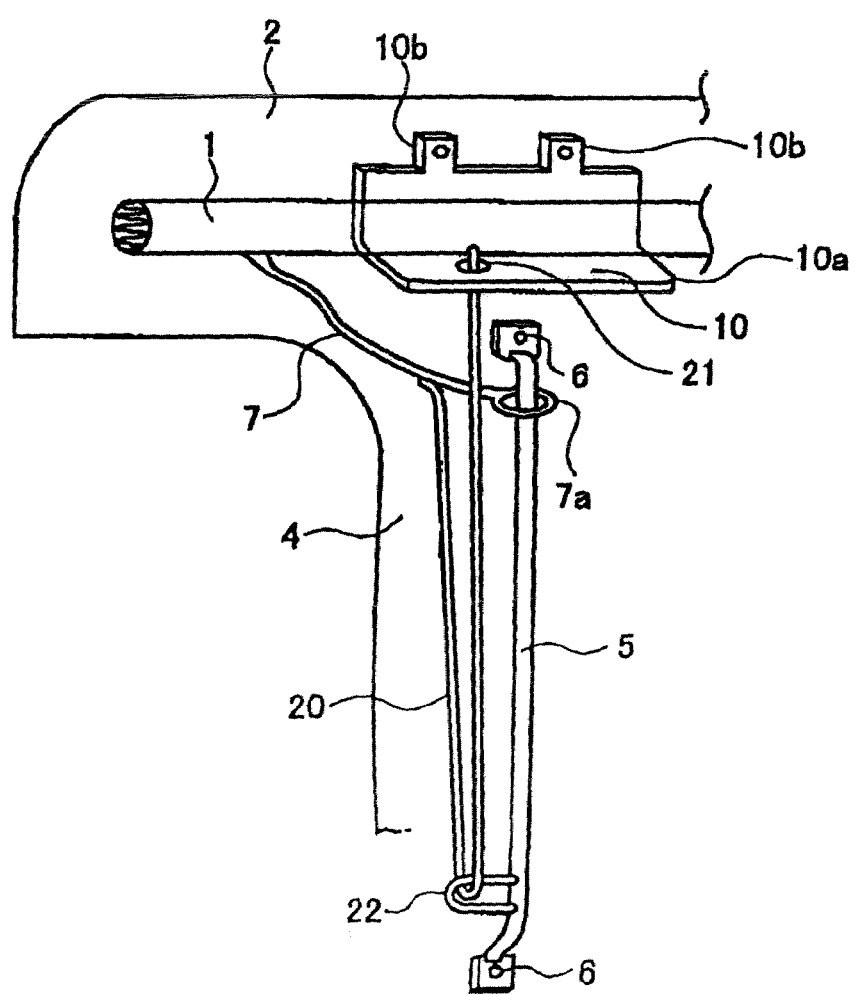
Figure 2A:
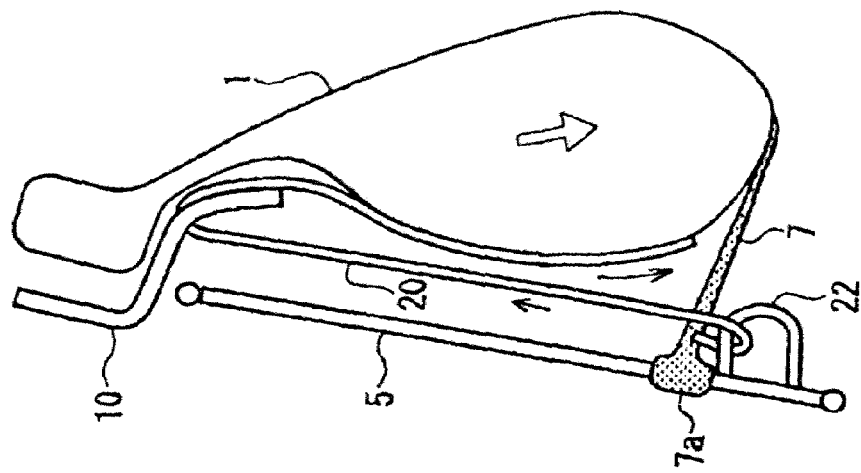
FIGS. 2(a)-2(c) include schematic cross-sectional views illustrating a deployment action of the curtain airbag shown in FIGS. 1(a) and 1(b).
Figure 2B:
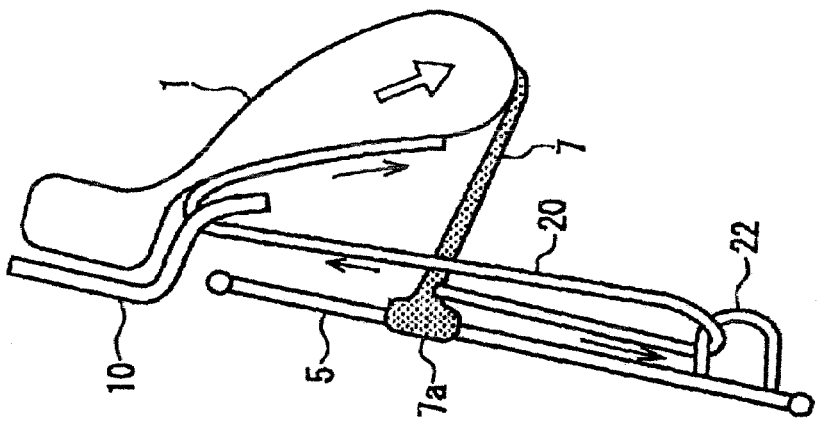
Figure 2C:
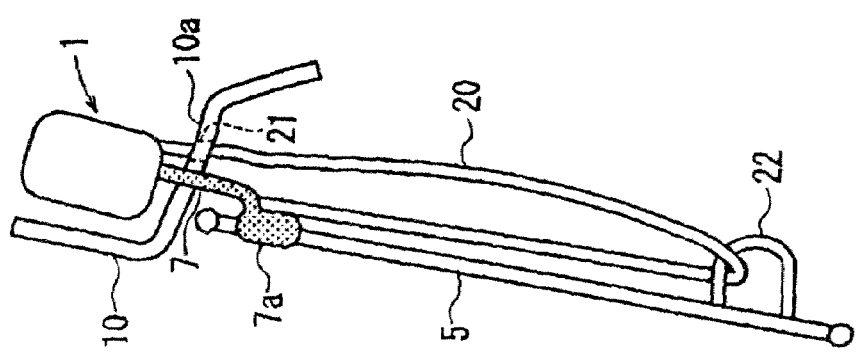
Figure 3A:
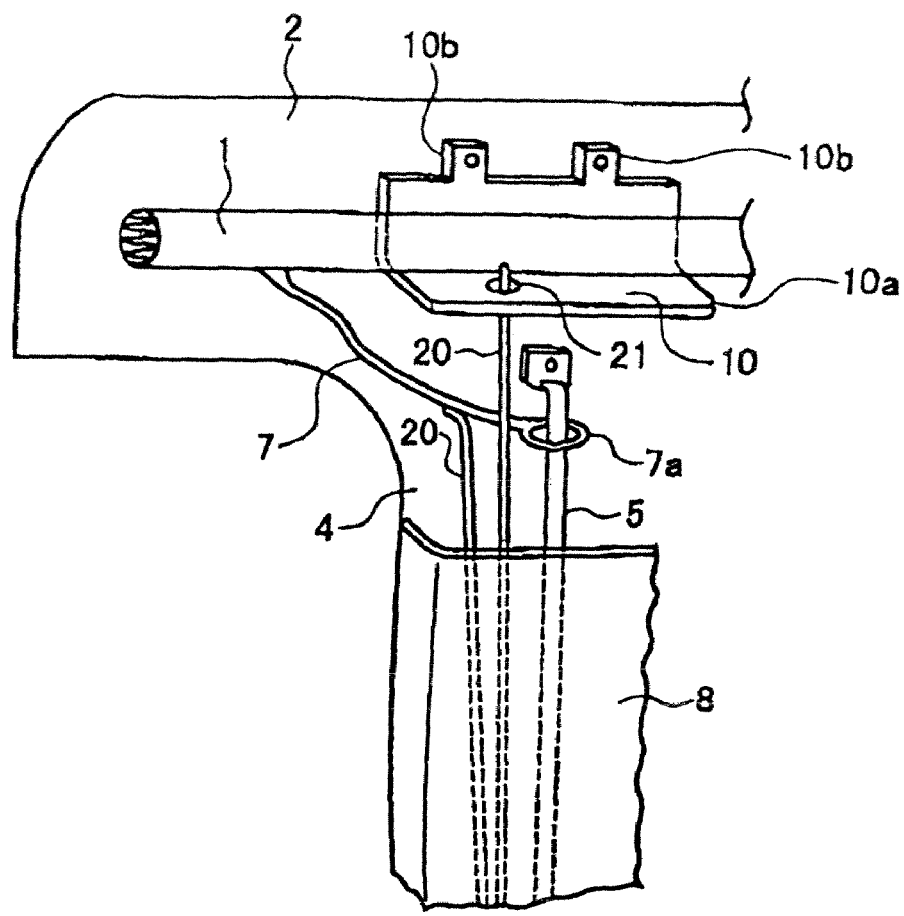
FIGS. 3(a) and 3(b) include a perspective view illustrating a state where a pillar garnish is installed, and a side view illustrating a state where the curtain airbag is being deployed.
Figure 3B:
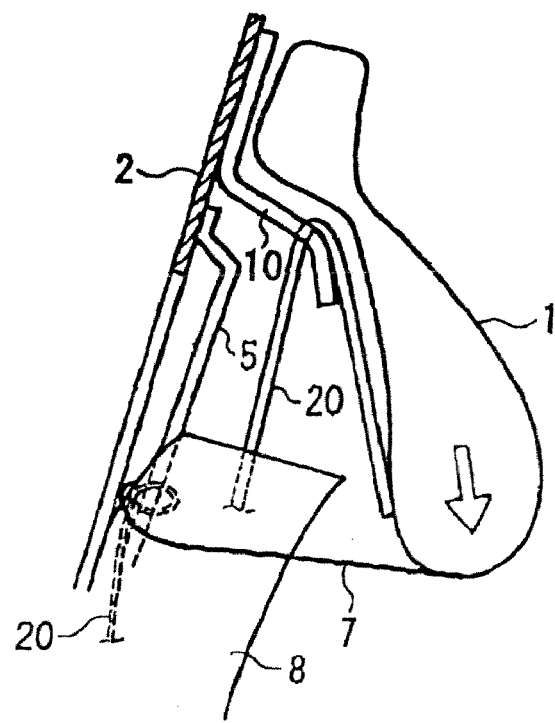

An embodiment of the present invention will now be described with reference to the drawings. FIGS. 1(a) and 1(b) illustrate a curtain airbag device according to the embodiment, and includes a schematic view FIG. 1(a) illustrating a curtain airbag extending along a roof side of a vehicle, and a guide rod disposed along a C pillar; and an enlarged perspective view FIG. 1(b) illustrating an area indicated by an arrow B in the schematic view FIG. 1(a). In FIGS. 1(a) and 1(b), a pillar garnish is omitted and not shown. FIGS. 2(a)-2(c) include schematic cross-sectional views illustrating a deployment action of the curtain airbag. FIG. 3(a) is a perspective view showing the same area as FIG. 1(b) and illustrating a state where a pillar garnish is installed. FIG. 3(b) is a side view illustrating a state where the curtain airbag is being deployed in the structure shown in FIG. 3(a).

According to this embodiment, a curtain airbag 1 is disposed along a roof side 2 of a vehicle (a border section between the ceiling and an inner side surface of a vehicle cabin) while being folded in a slender manner in the front-back direction of the vehicle. When the vehicle is involved in a side-on collision or a rollover, for example, the curtain airbag 1 is inflated as a result of gas being sent from an inflator 3. The curtain airbag 1 is deployed in the downward direction of the vehicle body along the side surface, i.e. doors and pillars, in the vehicle cabin. An upper edge of the curtain airbag 1 is provided with tabs (not shown). The tabs are fastened to the roof side 2.

A C-pillar 4 in the vehicle has a guide rod 5 serving as a guiding element attached thereto, which guides the rear portion of the curtain airbag 1 along the C pillar 4 when the curtain airbag 1 is deployed along the C pillar 4 in the downward direction of the vehicle body. The guide rod 5 has a rod-like structure which extends along the C pillar 4 in the vertical direction of the vehicle body. Both the upper and lower ends of the guide rod 5 are fixed to the C pillar 4 with bolts 6.

The bottom corner area in the rear portion of the curtain airbag 1 has a base end of a link strap 7, functioning as a linking member, attached thereto. On the other hand, a front end of the link strap 7 is provided with a loop 7a which is loosely wound around the guide rod 5. The loop 7a can be moved vertically along the guide rod 5.

A pillar garnish 8 covers the cabin-side of the C pillar 4. The door-frame portion of the C pillar 4 has a weather strip (not shown) attached thereto. A side edge of the pillar garnish 8 is in contact with the weather strip.

An overhang member 10, also known as a jump base, is disposed on the roof side 2 above the C pillar 4. When the curtain airbag 1 is to be deployed, the overhang member 10 allows the curtain airbag 1 to jump over and pass over the top of the pillar garnish 8 so that the curtain airbag 1 is guided towards the interior of the vehicle cabin. As shown in FIG. 3, a projected segment 10a of the overhang member 10 protrudes downslope from the roof side 2 towards the interior of the vehicle cabin.

Attachment segments 10b provided on the upper side of the overhang member 10 are fixed to the roof side 2 with, for example, bolts or rivets.

For guiding the downward movement of the link strap 7, a linear member 20 extends between the lower portion of the curtain airbag 1 and the link strap 7.

The linear member 20 extends through an upper guide component 21 defined by a hole provided in the projected segment 10a of the overhang member 10 and also through a lower guide component 22 integrally provided in the lower portion of the guide rod 5. The linear member 20 protrudes downward from the folded curtain airbag 1, extends through the upper guide component (hole) 21, and extends downward along the guide rod 5. Moreover, the linear member 20 is hooked through the lower guide component 22, which is laterally U-shaped. The linear member 20 extending through the lower guide component 22 is bent so as to extend upward, and is connected to the link strap 7. The linear member 20 is connected to a section of the link strap 7 that is closer to the front end thereof from the midsection of the link strap 7 between the base end and the front end (loop 7a). Alternatively, the linear member 20 may be connected to the loop 7a.

Although not shown in FIGS. 1 to 3, the roof side 2 is provided with a roof-side garnish such that the curtain airbag 1 is also covered with the roof-side garnish. The roof-side garnish abuts on the pillar garnish 8.

When a vehicle provided with such a curtain airbag device is involved in a side-on collision or a rollover, the inflator 3 generates gas so as to start inflating the curtain airbag 1. Then, the curtain airbag 1 pushes open the roof-side garnish, and the projected segment 10a of the overhang member 10 allows the curtain airbag 1 to jump over the top end of the pillar garnish 8, as shown in FIGS. 2(b) and 3(b), so as to guide the curtain airbag 1 towards the interior of the vehicle cabin. Subsequently, the curtain airbag 1 is deployed downward along the cabin-side of the pillar garnish 8.

The rear portion of the deploying curtain airbag 1 is guided by the guide rod 5 via the link strap 7. The link strap 7 starts moving downward along the guide rod 5 as the deployment process of the curtain airbag 1 begins. At this moment, as shown in FIG. 3(b), the link strap 7 enters a space between the pillar garnish 8 and the weather strip. During the deployment process of the curtain airbag 1, the link strap 7 moves downward while ripping through the pillar garnish 8 and the weather strip.

The link strap 7 moves downward along the guide rod 5 with the curtain airbag 1 until the curtain airbag 1 reaches the bottommost point of deployment. Since the link strap 7 connects the curtain airbag 1 and the guide rod 5, the curtain airbag 1 can be deployed along the side surface of the vehicle cabin. The curtain airbag 1 in a completely deployed state protects the head of a vehicle occupant. In this deployed state, since tension is created in the curtain airbag 1, the curtain airbag 1 is capable of retaining the vehicle occupant inside the vehicle cabin.

In this embodiment, when the curtain airbag 1 is being deployed downward, the linear member 20 is pulled by the curtain airbag 1. Since the linear member 20 pulls the loop 7a of the link strap 7 downward, the link strap 7 moves downward smoothly along the guide rod 5, whereby smooth deployment of the curtain airbag 1 is achieved.

According to this embodiment, since the upper guide component 21 is integrally provided in the overhang member 10, the installation of the upper guide component 21 is achieved simultaneously with the installation of the overhang member 10.

Furthermore, since the lower guide component 22 is integrally provided in the guide rod 5, the installation of the lower guide component 22 is achieved simultaneously with the installation of the guide rod 5. Accordingly, because each of the guide components 21, 22 is not singularly installed in the vehicle body, the installation process of the curtain airbag device in the vehicle body is simplified.

The present invention is not limited to the above embodiment. For example, a U-shaped upper guide component may alternatively be disposed in the upper portion of the guide rod 5. Furthermore, each of the guide components 21, 22 may alternatively be installed in the vehicle body in a singular fashion.

The above embodiment is only an example of the present invention, and modifications are permissible within the scope and spirit of the present invention. For example, instead of the loop 7a being provided in the link strap 7, a slider may be connected to the link strap 7 such that the slider is slidable along the guide rod 5. In that case, the linear member 20 may be connected to the slider.

According to the present invention, the guide rod 5 and the overhang member 10 may alternatively be disposed in a manner such that the curtain airbag 1 is guided along a B-pillar or an A-pillar. Moreover, an alternative guiding element may be used in place of the guide rod 5.

Furthermore, the overhang member 10 may alternatively be omitted in the present invention.

What is claimed is:

1. A curtain airbag device for deployment in a passenger compartment of a vehicle, the curtain airbag device comprising:
    a curtain airbag for being deployed in a generally downward direction in the vehicle;
    a guide for guiding the deployment of the curtain airbag in the downward direction;
    a follower for traveling along the guide during airbag deployment;
    a connector arranged and configured to extend between the airbag and the follower so that downward airbag deployment forces pull the follower down along the guide for smooth airbag deployment;
    a garnish that generally covers the guide and the connector so that the guide and the connector are behind the garnish prior to airbag deployment; and
    an overhang member above the garnish for directing the airbag over the garnish and guiding the connector from behind the garnish, over the garnish and down in front of the garnish during airbag deployment.

2. The curtain airbag device of claim 1 wherein the guide comprises a guide rod, and the follower extends loosely about the guide rod.

3. The curtain airbag device of claim 1 wherein the connector includes a strap member and the follower comprises a loop of the strap member that fits about the guide.

4. The curtain airbag device of claim 1 wherein the connector has two spaced apart connection locations to the curtain airbag.

5. The curtain airbag device of claim 4 wherein the connector includes one elongate member that extends from one of the two connection locations on the curtain airbag to the follower, and another elongate member that extends from the other connection location on the curtain airbag to the one elongate-member.

6. The curtain airbag device of claim 1 wherein the connector comprises a link extending between the airbag and the follower and a pull member extending between the airbag and the link for pulling the follower down along the guide upon airbag deployment.

7. The curtain airbag device of claim 1 including upper and lower guide members for guiding a first portion of the connector for travel in upward and downward directions during airbag deployment.

8. The curtain airbag device of claim 7 wherein the lower guide member is integral with the guide for the airbag.

9. The curtain airbag device of claim 7 wherein the upper guide member for the connector first portion is integral with the overhang member.

10. The curtain airbag device of claim 9 wherein the connector includes a second portion that extends transversely relative to the garnish from one side of the garnish to the other side thereof during airbag deployment.

11. The curtain airbag device of claim 10 wherein the first and second portions of the connector are distinct members that are attached together with the upper and lower guide members directing the first connector member over and around the garnish during airbag deployment.

12. A curtain airbag device for deployment within a cabin of a vehicle, the curtain airbag device comprising:
    a curtain airbag that extends lengthwise in a fore-and-aft direction at an upper position in the vehicle cabin prior to deployment for being deployed in a generally downward and inward, lateral direction into the vehicle cabin;

an airbag guide for guiding the deployment of the curtain airbag in the vehicle with the airbag guide being secured to a pillar of the vehicle;

a garnish for generally covering the airbag guide and vehicle pillar so that the airbag guide and vehicle pillar are behind the garnish;

a follower for traveling along the airbag guide during airbag deployment;

a connector extending between the airbag and the follower so that downward airbag deployment forces pull the follower down along the airbag guide;

at least one connector guide for guiding a predetermined portion of the connector from behind the garnish around the garnish during airbag deployment; and a link member of the connector connected between the airbag and the follower so that the link member extends from behind the garnish transversely thereto in the inward, lateral direction into the vehicle cabin past the garnish transverse to the fore-and-aft direction during deployment of the airbag to limit travel of the airbag in the inward, lateral direction away from the pillar of the vehicle.

13. The curtain airbag device of claim 12 wherein the connector guide includes an upper jump member integral therewith with the upper jump member disposed above the garnish and configured to direct the curtain airbag beyond the garnish during deployment thereof so as to avoid garnish interference with airbag deployment.

14. The curtain airbag device of claim 13 wherein the connector guide comprises a through opening in the upper jump member with the connector extending through the through opening.

15. The curtain airbag device of claim 12 wherein the at least one connector guide includes upper and lower connector guides, and during airbag deployment the connector includes a constant length portion extending between the upper and lower connector guides, and variable length portions extending from the upper connector guide to the airbag and from the lower connector guide to be operably connected to the follower.

16. The curtain airbag of claim 15 wherein the link member comprises another constant length portion of the connector extending between the airbag and the follower.

17. The curtain airbag device of claim 16 wherein the connector comprises multiple, distinct elongate members including the link member with one distinct connector member including the variable length portions of the connector and the constant length portion of the connector extending between the connector guides.

18. The curtain airbag device of claim 12 wherein the airbag guide is a rod for being substantially covered by the garnish.

19. The curtain airbag device of claim 18 wherein the follower comprises a loop that extends about the rod.

* * * * *